United States Patent [19]
Verge et al.

[11] Patent Number: 6,133,365
[45] Date of Patent: Oct. 17, 2000

[54] ONE-COMPONENT SYSTEM BASED ON COREACTIVE LATEXES LEADING TO COATING WHICH ARE CROSSLINKABLE AT ROOM TEMPERATURE AND POST-CROSSLINKABLE BY HEAT TREATMENT, AND THEIR APPLICATION IN THE FIELD OF COATINGS

[75] Inventors: Christophe Verge; Isabelle Betremieux, both of Beaumontel, France

[73] Assignee: Atofina, Paris-la-Defense, France

[21] Appl. No.: 09/065,446

[22] Filed: Apr. 24, 1998

[30] Foreign Application Priority Data

Apr. 29, 1997 [FR] France ................................ 97 05270

[51] Int. Cl.$^7$ ................................ C08F 2/16; C08J 3/02
[52] U.S. Cl. ........................ 524/501; 524/458; 524/460; 524/510; 524/512; 524/513; 525/154
[58] Field of Search ..................... 524/501, 510, 524/512, 513, 458, 460; 525/154

[56] References Cited

U.S. PATENT DOCUMENTS

| | | | |
|---|---|---|---|
| 3,947,396 | 3/1976 | Kangas et al. | 524/100 |
| 4,267,091 | 5/1981 | Geelhaar et al. | 524/510 |
| 4,367,298 | 1/1983 | Abbey et al. | 523/402 |
| 4,444,941 | 4/1984 | Borovicka et al. | 524/507 |
| 4,540,735 | 9/1985 | Borovicka, Sr. | 524/512 |
| 5,071,902 | 12/1991 | Langerbeins et al. | 524/458 |
| 5,260,356 | 11/1993 | Craun et al. | 523/414 |
| 5,804,632 | 9/1998 | Haddleton et al. | 524/458 |
| 5,877,239 | 3/1999 | Craun et al. | 523/403 |

FOREIGN PATENT DOCUMENTS 0 005 167  11/1979  European Pat. Off. .

*Primary Examiner*—P. Hampton-Hightower
*Attorney, Agent, or Firm*—Millen, White, Zelano & Branigan, P.C.

[57] ABSTRACT

The present invention relates to a one-component system based on coreactive latexes which is able to lead to coatings which are crosslinkable at low temperature and post-crosslinkable by heat treatment, the said system consisting of a mixture of two particle dispersions, (A) and (B), each obtained by aqueous emulsion polymerization of a monomer composition A and B, respectively, (a) at least one free-radically polymerizable ethylenically unsaturated monomer comprising a functional group

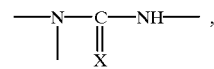

where X represents O or S, which enters into the monomer composition A; and (b) at least one free-radically polymerizable ethylenically unsaturated monomer comprising an N-alkylol or masked N-alkylol functional group which enters into the monomer composition B.

24 Claims, No Drawings

ONE-COMPONENT SYSTEM BASED ON COREACTIVE LATEXES LEADING TO COATING WHICH ARE CROSSLINKABLE AT ROOM TEMPERATURE AND POST-CROSSLINKABLE BY HEAT TREATMENT, AND THEIR APPLICATION IN THE FIELD OF COATINGS

CROSS-REFERENCE TO RELATED APPLICATION

This application is related to a concurrently filed application entitled "ONE-COMPONENT SYSTEM BASED ON COREACTIVE LATEXES LEADING TO COATINGS WHICH ARE CROSSLINKABLE AT ROOM TEMPERATURE AND POST-CROSSLINKABLE BY HEAT TREATMENT, AND THEIR APPLICATION IN THE FIELD OF COATINGS", attorney docket No.: ATOCM 122, based on French Application No. 97 05269, filed Apr. 29, 1997.

FIELD OF THE INVENTION

The present invention relates to a one-component system based on a mixture of coreactive latexes, which leads to coatings which are crosslinkable at room temperature and post-crosslinkable by heat treatment.

BACKGROUND OF THE INVENTION

The coatings industry (paints, adhesives, paper, leather and textile coatings) employs latexes as binders in film-forming formulations which in some cases require post-crosslinking, this being intended to improve the properties of the coatings obtained, especially in terms of their solvent content and their mechanical properties, and to reduce the surface tack, thereby allowing a reduction in the soiling potential in the case of exterior paints.

This step of post-crosslinking must be adapted to the area of application and to the operating conditions (in the field of paints no heat treatment of the coating can be envisaged, whereas the textile industry currently employs processes of thermal crosslinking at temperatures of the order of 160° C.).

Irrespective of the intended application, the objective is to obtain a system which is as reactive as possible at the lowest possible temperature whilst being a one-component system; in other words, one which is ready to use and is stable on storage, these two requirements very often being contradictory.

Moreover, owing to the constraints in terms of the protection of people and the environment, another objective consists in reducing the emission of volatile organic compounds, like the solvents used for the temporary plastification of the latexes (reduction in the film-forming temperature without diminishing the glass transition temperature of the copolymer and hence without lessening the mechanical properties of the film), formaldehyde, etc.

SUMMARY OF THE INVENTION

A latex mixture has now been discovered which is able to meet all of these objectives since it is stable on storage and leads to films which are crosslinkable at room temperature, this crosslinking being activated by a heat treatment at high temperature which causes only a small release of formaldehyde.

The two latexes which make up the mixture of the invention are functionalized, one by a group of the ureido type and the other by a group of the N-alkylol type. Following their synthesis, these latexes can be mixed without reaction between their respective above-mentioned functions during storage, and in the course of or following coalescence at room temperature they lead to a crosslinked film having properties which are improved with respect to the base latexes, it being possible for the said crosslinking to be activated by a heat treatment.

The discovery of this combination of latexes is all the less obvious since it is not enough that the abovementioned functions react with one another merely during or after coalescence; it is also necessary that the crosslinking kinetics do not disrupt the coalescence of the particles and hence the formation of the film—too great a rate of crosslinking could in fact hamper the formation of the film and render a system unusable.

The American patent U.S. Pat. No. 5,071,902 and the application for European patent EP-A-488 605 disclose the use of ureido-functional monomers in combination with N-methylolacrylamide by copolymerization with a view to obtaining a latex leading to thermally crosslinkable films having reduced contents of free and releasable formaldehyde.

These two documents relate to the scavenging of the formaldehyde released by the N-methylolacrylamide by the ureido-functional monomer without altering the crosslinking of the film by the N-methylolacrylamide, and makes no mention at all of the possibility of obtaining a reactive N-alkylol/ureido system.

The behaviour of the system according to the present invention and of such latexes, which are known as "difunctional" latexes, is entirely different; thus Example 3 below clearly shows the impossibility of increasing the crosslinking by heat treatment in the case where such a "difunctional" latex is employed. In the system of the invention, the N-alkylolamide or the like no longer reacts with itself, as is the case with the conventional process, the absence of release of formaldehyde being explained in this case by the fact that the N-alkylolacrylamide or the like reacts with the ureido groups by another mechanism, which does not involve a formaldehyde formation step.

The present invention therefore firstly provides a one-component system based on coreactive latexes which is able to lead to coatings which are crosslinkable at low temperature and post-crosslinkable by heat treatment, the said system consisting essentially of the mixture of two particle dispersions (A) and (B), each obtained by aqueous emulsion polymerization of a monomer composition A and B, respectively, (a) at least one free-radically polymerizable ethylenically unsaturated monomer comprising a functional group

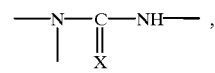

where X represents O or S, which enters into the monomer composition A; and (b) at least one free-radically polymerizable ethylenically unsaturated monomer comprising an N-alkylol or masked N-alkylol functional group which enters into the monomer composition B.

The monomers (a) can be selected from those represented by the formulae (I) to (III) below:

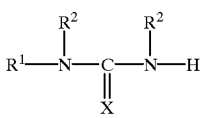  (I)

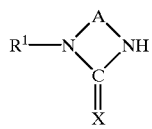  (II)

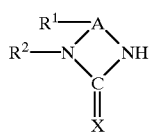  (III)

in which:

X represents O or S;

$R^1$ is a free-radically polymerizable ethylenically unsaturated group;

$R^2$ is a hydrogen atom or a $C_1$–$C_8$ alkyl group; and

A is an alkylene chain which has 2 or 3 carbon atoms and can be substituted by lower alkyl and/or hydroxyl and/or $C_1$–$C_4$ alkoxy, and/or which can be interrupted by carbonyl.

The group $R^1$ above can be selected from the groups:

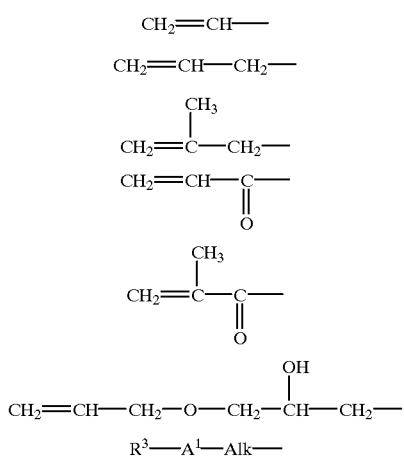

where:

$R^3$ represents hydrogen, 3-alkyloxy-2-hydroxy-propyl, vinyl, methacryloyl, acryloyl or methacryloyloxyaceto;

$A^1$ represents O, NH or $NR^4$;

$R^4$ represents 3-allyloxy-2-hydroxypropyl when $R^3$ represents 3-allyloxy-2-hydroxypropyl;

Alk represents a $C_2$–$C_8$ alkylene chain; and 2-(β-carboxyacrylamido)ethyl.

Examples that may be mentioned of monomers (a) are N-(2-methacryloyloxyethyl)ethyleneurea, N-(2-acryloyloxyethyl)ethyleneurea, N-(methacrylamidomethylene)ethyleneurea, N(acrylamidomethylene)-ethyleneurea, N-(β-methacrylamidoethyl)ethyleneurea, N-(β-acrylamidoethyl)ethyleneurea, N-vinylethyleneurea, N-vinyloxyethylethyleneurea, N-[β-(methacryloyloxy-acetamido)ethyl]-N,N'-ethyleneurea, N-[β-(acryloyloxy-acetamido)ethyl]ethyleneurea, 1-[2-[[2-hydroxy-3-(2-propenyloxy)propyl]amino]ethyl]-2-imidazolidone, N-methacrylamidomethylurea, N-methacryloylurea, N-(3-[1,3-diazacyclohexan-2-one]propyl)methacrylamide, N-hydroxyethylethyleneurea, N-aminoethylethyleneurea, N-(3-allyloxy-2-hydroxypropyl)aminoethylethyleneurea, N-methacrylaminoethylethyleneurea, N-acrylaminoethyl-ethyleneurea, N-methacryloxyacetoxyethylethyleneurea, N-methacryloxyacetaminoethylethyleneurea and N-di(3-allyloxy-2-hydroxypropyl)aminoethylethyleneurea, N-(2-acryloyloxyethyl) ethyleneurea, N-methacrylamidomethylurea and the allylalkylethyl-eneureas.

A particularly preferred monomer (a) is N-(2-methacryloyloxyethyl)ethyleneurea (1-(2-methacryloyloxy-ethyl)imidazolin-2-one).

As for the monomers (b), they can be selected from the N-methylolamides of unsaturated carboxylic acids having 3 to 10 carbon atoms, such as N-methylolacrylamide and N-methylolmethacrylamide, N-methylolmaleimide, N-methylolmaleamic acid, esters of N-methylolmaleamic acid, the N-methylolamides of vinylaromatic acids, such as N-methylol-p-vinylbenzamide, and, as monomers (b) having masked N-alkylol groups, the N-(lower alkoxy-methyl) amides of acrylic and/or methacrylic acid.

The preferred monomers (b) are N-methylolacrylamide and N-methylolmethacrylamide.

Preferably, the monomer or monomers (a) and (b) represent from 0.5 to 10% by weight, in particular from 1 to 5% by weight, of the monomer composition A and B respectively. The monomers (a) and (b) can be introduced homogeneously with the other monomers or in compositional gradients which make it possible to obtain products having different densities of functions.

The proportions of the two coreactive latexes according to the present invention are chosen such that the proportion of the polymer (A) is between 5 and 95% by weight, in particular between 25 and 75% by weight, of the polymers (A) and (B), and the proportion of the polymer (B) is between 95 and 5% by weight, in particular between 75 and 25% by weight, of the polymers (A) and (B), the nonvolatiles content of each of the dispersions generally being between 20 and 60% by weight.

In addition, the size of the particles of each of the dispersions (A) and (B) is, in particular, between 50 and 500 nm.

The monomers other than the monomers (a) and (b) of the two particle dispersions (A) and (B) of the invention are not critical provided that the glass transition temperatures (Tg) of the resulting copolymers have been adapted to the intended field of application. The combination of monomers capable of leading to homopolymers having different glass transition temperatures therefore makes it possible to control the glass transition temperature of each of the copolymers obtained, in other words by the combination of monomers leading to high Tg with monomers leading to low Tg, as is well known to the skilled worker.

Examples that may be mentioned of monomers capable of leading to homopolymers having a low Tg are ethyl acrylate, butyl acrylate, 2-ethylhexyl acrylate, nonyl acrylate, vinyl 2-ethylhexanoate, etc.

Examples that may be mentioned of monomers capable of leading to homopolymers having a high glass transition temperature are methyl methacrylate, vinyl acetate, styrene, acrylic acid, methacrylic acid, acrylamide, etc.

The two latexes of the invention are prepared by emulsion polymerization under conditions well known to the skilled worker. Thus the reaction is preferably conducted under an inert atmosphere in the presence of free-radical initiators. The initiator system employed may be a redox system, such as $K_2S_2O_8$, $(NH_4)_2S_2O_8/Na_2S_2O_5$, $Na_2SO_3$, a thermal system, such as $(NH_4)_2S_2O_8$, the amounts used being between 0.2 and 1.0% by weight relative to the total mass of the monomers, preferably between 0.25 and 0.5% by weight.

The emulsion polymerization reaction of the invention is carried out at a temperature which is between 65 and 85° C. and which depends on the nature of the initiator system employed: 65–75° C. for redox systems based on peroxodisulphate and metabisulphite, and 70–85° C. for thermal systems based on peroxodisulphate alone.

The dispersions of the invention are preferably prepared by a semicontinuous process which makes it possible to limit the compositional derivatives which are a result of the differences in reactivity between the various monomers. The monomers are thus generally introduced in the form of a pre-emulsion with a portion of the water and surfactants over a period of time of from 3.5 to 5 hours. It is also useful, if not indispensable, to carry out seeding with from 1 to 15% of the monomers. The emulsifier systems employed in the emulsion polymerization process of the invention are chosen from the range of emulsifiers having an appropriate hydrophilic/lipophilic balance. The preferred systems consist of the combination of an anionic surfactant, such as sodium lauryl sulphate, ethoxylated nonylphenol sulphates incorporating in particular 20–25 moles of ethylene oxide, dodecylbenzenesulphonate and ethoxylated fatty alcohol sulphates, and a nonionic surfactant, such as ethoxylated nonylphenols incorporating in particular 10–40 moles of ethylene oxide, and ethoxylated fatty alcohols.

The total amount of emulsifier is generally within the range from 1 to 5% by weight and preferably from 2 to 4% by weight relative to the monomers.

The mixtures of dispersions (A) and (B) of the invention are realized at room temperature.

The films obtained from the latex mixtures of the invention were analysed as obtained after drying at room temperature and then after an additional heat treatment of 15 minutes at 160° C.

The film properties that were evaluated are the solvent resistance, which is determined by measuring the percentage of insolubles in samples immersed in acetone at room temperature for 24 h and the percentage of acetone absorbed by these samples, also referred to as "swelling index", and the mechanical properties of the film, by way of a tensile test (determination of the breaking stress and elongation at break).

The degree of crosslinking of the films—which determines very good performance properties—is characterized by as high as possible an insolubles content, as low as possible a swelling index, and a breaking stress and elongation at break which are as high as possible.

The existence of crosslinking at room temperature of the film in the course of coalescence is demonstrated by a film obtained from the mixture leading to properties superior to those of the initial latexes, while the existence of thermal crosslinking of the film is demonstrated by comparing the properties before and after heat treatment.

Under these conditions, it was observed that the mixtures of coreactive latexes of the invention lead to films which crosslink at room temperature and thus exhibit improved properties.

The good stability on storage of the latex mixtures, in other words the possibility of producing one-component (one-pack) systems, is verified by determining the properties of the film obtained from a mixture which has been stored for 10 days at 60° C. and comparing these properties with the properties of the film obtained from a freshly prepared mixture. The stability of the latexes is also verified by monitoring the basic characteristics of the latex, i.e. the particle size, viscosity, etc.

The properties of films obtained from the mixtures of the invention before and after heat treatment for 15 minutes at 160° C. are equal irrespective of the treatment undergone by the latex mixtures (fresh mixture or mixture treated for 10 days at 60° C.), thereby demonstrating the good stability on storage of the mixtures.

The present invention likewise provides for the use of the one-component system based on coreactive latexes, as defined above, as a binder in compositions intended for producing a crosslinkable coating, such as a paint in the architectural field, a varnish or a finish for leather, a finish for textiles, a protective varnish for wood, or in compositions for the coating of paper; as a binder and/or impregnating agent for various woven or nonwoven textile materials, paper, cardboard, fibre webs; and as an adhesive, especially in the woodworking industry.

The examples which follow illustrate the present invention without, however, limiting its scope. In these examples, the parts and percentages are by weight unless indicated otherwise. In Example 1, the quantities of the ingredients in the formulations and of the monomers are expressed in parts of active substance.

EXAMPLE 1

Synthesis of latexes A, B and C

General procedure

A 3 l reactor equipped with hot water circulation in the jacket, a central stirrer and a condenser is charged with an initial charge formulated as follows:

Water 54.00 parts

Sodium ethoxylated fatty alcohol sulphate, 32% in water 0.25 parts

Ethoxylated fatty alcohol, 65% in water 0.05 parts

This initial charge is homogenized and brought to 75° C.

When the temperature of the initial charge reaches 75° C., the pre-emulsion and initiator solution, formulated as shown below, are run in over the course of four hours:

Pre-emulsion

Water 62.00 parts

Sodium ethoxylated fatty alcohol sulphate, 32% in water 2.25 parts

Ethoxylated fatty alcohol, 65% in water 0.45 parts

Monomers 100.00 parts

Sodium bicarbonate $NaHCO_3$ 0.20 parts)

Initiator solution

Water 6.00 parts

Sodium persulphate 0.30 parts

The mixture is left to react for one hour more at 75° C.

It is then cooled to room temperature and filtered through a 100 μm mesh.

Preparation of the latexes A, B and C

The latexes A, B and C were synthesized from monomers A, B and C, respectively, as indicated in Table 1, which also shows the characteristics of the latexes obtained.

TABLE 1

| Monomers | A | B | C |
|---|---|---|---|
| Ethyl acrylate | 90 | 97 | 54.7 |
| Methyl methacrylate | | | 33.3 |
| Acrylic acid | | | 5.0 |
| 1-(2-Methacryloyloxyethyl) imidazol-in-2-one in solution at a concentration of 50% in methyl methacrylate, sold by the company "ELF ATOCHEM" under the name "NORSOCRYL 104" | 10 | | 5.0 |
| N-Methylolacrylamide in aqueous solution at a concentration of 48% | | 3 | 2.0 |
| NaHCO₃ | no | yes | no |
| Latex | A | B | C |
| Nonvolatiles content (%) | 45.3 | 44.0 | 44.6 |
| pH | 1.6 | 6.1 | 1.9 |
| Diameter (nm) | 141 | 134 | 158 |
| Viscosity (mPa · s) | <100 | <100 | <100 |

EXAMPLE 2

Crosslinking and crosslinkability of films obtained from the latexes A, B and C

The degree of pre-crosslinking of films obtained from the latexes A, B and C, respectively, by drying at 23° C. and 50% relative humidity was determined on samples measuring 10×25 mm and with a thickness of between 1 and 2 mm after immersion for 24 hours in acetone at room temperature (measurement of the resistance to the acetone solvent) by measuring the percentage of acetone absorbed (swelling index) and the insolubles content. The results (in each case the mean of three measurements) are reported in Table 2.

Similarly, the degree of thermal post-crosslinking was determined on films obtained from the latexes A, B and C, respectively, dried as before and then subjected to heat treatment for 15 minutes at 160° C. The results are likewise indicated in Table 2.

TABLE 2

| Film obtained from the latex | A | B | C |
|---|---|---|---|
| Swelling index (23° C.) (%) | 10.9 | 30.3 | 3.3 |
| Swelling index (160° C.) (%) | 8.3 | 5.6 | 3.1 |
| % insolubles (23° C.) | 72.3 | 72.4 | 95.3 |
| % insolubles (160° C.) | 90.5 | 90.7 | 96.1 |

The film of latex A presents a certain degree of pre-crosslinking and slight thermal post-crosslinkability, whereas the film of latex B is only slightly pre-crosslinked but exhibits an excellent heat-crosslinkability.

As regards latex C, it is very strongly pre-crosslinked, with no post-crosslinking whatsoever being observed.

EXAMPLE 3

Mixture of coreactive latexes

The latexes A and B were mixed at room temperature in the proportion 50:50. The characteristics of the film originating from this mixture were examined as in Example 2: after drying at 23° C., 50% RH, then after heat treatment for 15 minutes at 160° C.

The results are reported in Table 3, which for purposes of comparison also repeats the data of Table 2.

TABLE 3

| Latex or mixture No. | Latex A (%) | Latex B (%) | Swelling index (23° C.) (%) | Swelling index (160° C.) (%) | % insolubles (23° C.) | % insolubles (160° C.) |
|---|---|---|---|---|---|---|
| 1 | 100 | 0 | 10.9 | 8.3 | 72.3 | 90.5 |
| 2 | 50 | 50 | 7.6 | 4.4 | 92.2 | 93.1 |
| 3 | 0 | 100 | 30.3 | 5.6 | 72.4 | 90.7 |

The films obtained from mixtures of the latexes A and B show a greater degree of crosslinking than the films obtained from the base latexes A and B, showing the existence of crosslinking at room temperature. This crosslinking can be augmented by heat treatment, in contradistinction to the latex C, which comprises a combination of the two functional monomers 1-(2-methacryloyloxyethyl)imidazolin-2-one and N-methylolacrylamide and for which no post-crosslinking whatsoever is observed.

EXAMPLE 4

Mechanical properties

The mechanical properties of the film obtained from the mixture No. 2 are compared with the mechanical properties of the films obtained from the latexes A and B by means of a tensile test carried out in accordance with the standard ISO 527. The results are presented in Table 4.

TABLE 4

| Film obtained from the latex | Elongation at break (%) drying 23° C. | Breaking stress (MPa) drying 23° C. | Elongation at break (%) tempering 160° C. | Elongation at break (MPa) tempering 160° C. |
|---|---|---|---|---|
| A | 488 | 1.15 | 440 | 0.64 |
| B | 347 | 1.93 | 134 | 1.3 |
| Mixture No. 2 | 306 | 1.9 | 214 | 1.57 |

EXAMPLE 5

Stability on storage

Mixture No. 2 is stored for 10 days at 60° C. and then cooled to room temperature. A new film is then prepared as above by drying the latex at 23° C. The acetone resistance of the film before and after heat treatment is compared with that of the film obtained from the fresh mixture, the results being presented in Table 5.

TABLE 5

| Film obtained from the latex | Swelling index (23° C.) (%) | Swelling index (160° C.) (%) | % insolubles (23° C.) | % insolubles (160° C.) |
|---|---|---|---|---|
| Mixture No. 2 | 7.6 | 4.4 | 92.2 | 93.1 |
| Mixture No. 2 (10d; 60° C.) | 6.1 | 4.3 | 86.9 | 93.9 |

The properties of the film after accelerated aging of the latex for 10 days at 60° C. are largely the same as those of the film obtained with the fresh latex.

EXAMPLE 6

Formaldehyde assay

The releasable formaldehyde is determined by chromatographic analysis, by subjecting a film to a heat treatment of 30 minutes at 160° C., the compounds given off being trapped in an aqueous solution containing dinitrophenyl hydrazide, which is intended for derivatizing the formaldehyde. The aqueous solution collected in the trap is analysed by gas chromatography.

The free formaldehyde is obtained from the difference between the releasable formaldehyde and the total formaldehyde, the latter being obtained by subjecting a latex sample to the same treatment as above.

The results are presented in Table 6.

TABLE 6

| Film obtained from the latex | Free formaldehyde (ppm) | Releasable formaldehyde (ppm) |
|---|---|---|
| A | — | — |
| B | 339 | 197 |
| C | 74 | 26 |
| Mixture No. 2 | 109 | 23 |

Mixture No. 2 leads to levels of formaldehyde which are comparable with those given by the latex C, but has the advantage of leading to films which are post-crosslinkable, as was seen above.

The entire disclosure of all applications, patents and publications, cited above and below, and of corresponding French application No. 97 05270, filed Apr. 29, 1997, is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A one-component system based on coreactive latexes capable of providing coatings which are crosslinkable at room temperature and post-crosslinkable by heat treatment and essentially without releasing formaldehyde, the said system consisting essentially of the mixture of two particle dispersions (A) and (B), each derived from aqueous emulsion polymerization of a monomer composition A and B, respectively, (a) at least one free-radically polymerizable ethylenically unsaturated monomer comprising a functional group $$-N-C-NH-$$
$$\quad\ \ \|$$
$$\quad\ \ X$$

where X represents O or S, which enters into the monomer composition A; and (b) at least one free-radically polymerizable ethylenically unsaturated monomer comprising an N-alkylol or masked N-alkylol functional group which enters into the monomer composition B.

2. A system according to claim 1, wherein the monomer or monomers (a) are selected from those represented by the formulae (I) to (III) below:

$$R^1-N(R^2)-C(=X)-N(R^2)-H \quad (I)$$

$$R^1-N\underset{\underset{X}{\overset{\|}{C}}}{\overset{A}{\diagdown}}NH \quad (II)$$

$$R^1,R^2-N\underset{\underset{X}{\overset{\|}{C}}}{\overset{A}{\diagdown}}NH \quad (III)$$

in which:
X represents O or S;
$R^1$ is a free-radically polymerizable ethylenically unsaturated group;
$R^2$ is a hydrogen atom or a $C_1$–$C_8$ alkyl group; and
A is an alkylene chain which has 2 or 3 carbon atoms and can be substituted by lower alkyl and/or hydroxyl and/or $C_1$–$C_4$ alkoxy, and optionally interrupted by carbonyl.

3. A system according to claim 2, characterized in that $R^1$ is selected from the groups:

$$CH_2=CH-$$

$$CH_2=CH-CH_2-$$

$$CH_2=C(CH_3)-CH_2-$$

$$CH_2=CH-C(=O)-$$

$$CH_2=C(CH_3)-C(=O)-$$

$$CH_2=CH-CH_2-O-CH_2-CH(OH)-CH_2-$$

$$R^3-A^1-Alk-$$

where:
$R^3$ represents hydrogen, 3-alkyloxy-2-hydroxy-propyl, vinyl, methacryloyl, acryloyl or methacryloyloxyaceto;
$A^1$ represents O, NH or $NR^4$;
$R^4$ represents 3-allyloxy-2-hydroxypropyl when $R^3$ represents 3-allyloxy-2-hydroxypropyl;
Alk represents a $C_2$–$C_8$ alkylene chain; and
2-(β-carboxyacrylamido)ethyl.

4. A system according to claim 1, wherein the monomer or monomers (a) are selected from N-(2-methacryloyloxyethyl)ethyleneurea, N-(2-acryloyloxyethyl)ethyleneurea, N-(methacrylamido-methylene)ethyleneurea, N(acrylamidomethylene)-ethyleneurea, N-(β-methacrylamidoethyl)ethyleneurea, N-(β-acrylamidoethyl) ethyleneurea, N-vinylethyleneurea, N-vinyloxyethylethyleneurea, N-[β-(methacryloyloxy-acetamido)ethyl]-N,N'-ethyleneurea, N-[β-(acryloyloxy-acetamido)ethyl]ethyleneurea, 1-[2-[[2-hydroxy-3-(2-propenyloxy)propyl]amino]ethyl]-2-imidazolidone, N-methacrylamidomethylurea, N-methacryloylurea, N-(3-[1,3-diazacyclohexan-2-one]propyl)methacrylamide, N-hydroxyethylethyleneurea, N-aminoethylethyleneurea, N-(3-allyloxy-2-hydroxypropyl)aminoethylethyleneurea, N-methacrylaminoethylethyleneurea, N-acrylaminoethyl-ethyleneurea, N-methacryloxyacetoxyethylethyleneurea, N-methacryloxyacetaminoethylethyleneurea and N-di(3-allyloxy-2-hydroxypropyl)aminoethylethyleneurea, N-(2-acryloyloxyethyl)ethyleneurea, N-methacrylamidomethylurea and the allylalkylethyl-eneureas.

5. A system according to claim 1, wherein the monomer (a) is N-(2-methacryloyloxyethyl)ethyleneurea (1-(2-methacryloyloxyethyl)imidazolin-2-one).

6. A system according to claim 1, wherein the monomer or monomers (b) are selected from the N-methylolamides of unsaturated carboxylic acids having 3 to 10 carbon atoms, such as N-methylolacrylamide and N-methylolmethacrylamide, N-methylolmaleimide, N-methylolmaleamic acid, esters of N-methylolmaleamic acid, the N-methylolamides of vinylaromatic acids, selected from N-methylol-p-vinylbenzamide, and the N-(lower alkoxy-methyl)amides of acrylic and/or methacrylic acid.

7. A system according to claim 1, wherein the monomer (b) is N-methylol(meth)acrylamide.

8. A system according to claim 1, wherein the monomer or monomers (a) and (b) represent from 0.5 to 10% by weight of the monomer composition A and B respectively.

9. A system according to claim 1, wherein the proportions of the two coreactive latexes are chosen such that the proportion of the polymer (A) is between 5 and 95% by weight, of the polymers (A) and (B), and the proportion of the polymer (B) is between 95 and 5% by weight, of the polymers (A) and (B), the nonvolatiles content of each of the dispersions being between 20 and 60% by weight.

10. A system according to claim 1, wherein the size of the particles of each of the dispersions (A) and (B) is between 50 and 500 nm.

11. A system according to claim 8, wherein monomers other than the monomers (a) and (b) of the two particle dispersions (A) and (B) are chosen so that the glass transition temperatures (Tg) of the resulting copolymers are adapted to the intended field of application, by the combination of monomers capable of leading to homopolymers having a relatively high Tg with monomers capable of leading to homopolymers having a low Tg.

12. A system according to claim 11, wherein the monomers capable of leading to homopolymers having a low Tg are selected from ethyl acrylate, butyl acrylate, 2-ethylhexyl acrylate, nonyl acrylate and vinyl 2-ethylhexanoate; and the monomers capable of leading to homopolymers having a high Tg are selected from methyl methacrylate, vinyl acetate, styrene, acrylic acid, methacrylic acid and acryla-mide.

13. A composition comprising a one-component system of coreactive latexes, as defined in claim 1, said composition being a binder intended for producing a crosslinkable coating, a paint in the architectural field, a varnish or a finish for leather, a finish for textiles, a protective varnish for wood, or a composition for the coating of paper; a binder and/or impregnating agent for woven or nonwoven textile materials, paper, cardboard, fiber webs; or as an adhesive composition for wood.

14. A system according to claim 4, characterized in that the monomer or monomer s(b) are selected from the N-methylolamides of unsaturated carboxylic acids having 3 to 10 carbon atoms, selected from N-methylolacrylamide and N-methylolmethacrylamide, N-methylolmaleimide, N-methylolmaleamic acid, esters of N-methylolmaleamic acid, the N-methylolamides of vinylaromatic acids, selected from N-methylol-p-vinylbenzamide, and the N-(lower alkoxymethyl) amides of acrylic and/or methacrylic acid.

15. A system according to claim 5, characterized in that the monomer (b) is N-methylol(meth)acrylamide.

16. A partially crosslinked film produced by applying the system of claim 1 to a substrate.

17. A crosslinked film obtained by heating the film of claim 16, the crosslinking being augmented thereby.

18. A system according to claim 14, characterized in that the monomer or monomers (a) and (b) represent from 0.5 to 10% by weight of the monomer composition A and B, respectively.

19. A system according to claim 18, characterized in that the size of the particles of each of the dispersions (A) and (B) is between 50 and 500 nm.

20. A system according to claim 15, wherein the monomers (A) and (B) represent from 0.5 to 10% by weight of the monomer in composition A and B, respectively; the proportion of the polymer (A) is between 5 and 95% by weight, of the polymer s(A) and (B), and the proportion of the polymer (B) is between 95 and 5% by weight, of the polymer s(A) and (B), the nonvolatiles content of each of the dispersions being between 20 and 60% by weight; and the size of the particles of each of the dispersions (A) and (B) is between 50 and 500 nm.

21. A one-component system based on coreactive latexes capable of providing coatings which are crosslinkable at room temperature and post-crosslinkable by heat treatment, the said system consisting essentially of the mixture of two particle dispersions (A) and (B), each derived from aqueous emulsion polymerization of a monomer composition A and B, respectively, (a) at least one free-radically polymerizable ethylenically unsaturated monomer comprising a functional group

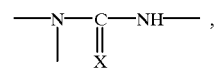

where X represents O or S, which enters into the monomer composition A; and (b) at least one free-radically polymerizable ethylenically unsaturated monomer comprising an N-alkylol or masked N-alkylol functional group which enters into the monomer composition B, and wherein the monomer or monomers (a) are selected from those represented by the formulae (I) to (III) below:

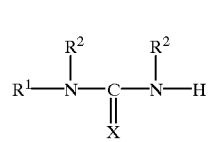

-continued

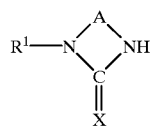
(II)

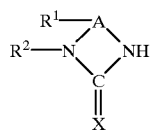
(III)

in which:
x represents O or S;
$R^1$ is a free-radically polymerizable ethylenically unsaturated group;
$R^2$ is a hydrogen atom or a $C_1$–$C_8$ alkyl group; and
A is an alkylene chain which has 2 or 3 carbon atoms and can be substituted by lower alkyl and/or hydroxyl and/or $C_1$–$C_4$ alkoxy, and optionally interrupted by carbonyl, and wherein $R_1$ is selected from the groups:

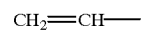

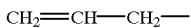

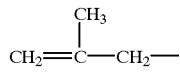

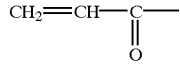

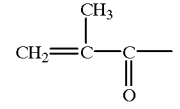

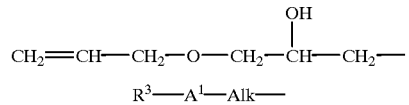

$R^3$—$A^1$—Alk—

$R^3$ represents hydrogen, 3-alkyloxy-2-hydroxy-propyl, vinyl, methacryloyl, acryloyl or methacryloyloxyaceto;
$A^1$ represents O, NH or $NR^4$;
$R^4$ represents 3-allyloxy-2-hydroxypropyl when $R^3$ represents 3-allyloxy-2-hydroxypropyl;
Alk represents a $C_2$–$C_8$ alkylene chain; and
2-(β-carboxyacrylamido)ethyl.

22. A one-component system based on coreactive latexes capable of providing coatings which are crosslinkable at room temperature and post-crosslinkable by heat treatment, the said system consisting essentially of the mixture of two particle dispersions (A) and (B), each derived from aqueous emulsion polymerization of a monomer composition A and B, respectively,
(a) at least one free-radically polymerizable ethylenically unsaturated monomer comprising a functional group

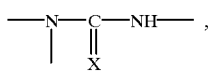

where X represents O or S, which enters into the monomer composition A; and (b) at least one free-radically polymerizable ethylenically unsaturated monomer comprising an N-alkylol or masked N-alkylol functional group which enters into the monomer composition B, wherein the proportions of the two coreactive latexes are chosen such that the proportion of the polymer (A) is between 5 and 95% by weight, of the polymers (A) and (B), and the proportion of the polymer (B) is between 95 and 5% by weight, of the polymers (A) and (B), the nonvolatiles content of each of the dispersions being between 20 and 60% by weight.

23. A one-component system based on coreactive latexes capable of providing coatings which are crosslinkable at room temperature and post-crosslinkable by heat treatment, the said system consisting essentially of the mixture of two particle dispersions (A) and (B), each derived from aqueous emulsion polymerization of a monomer composition A and B, respectively,
(a) at least one free-radically polymerizable ethylenically unsaturated monomer comprising a functional group

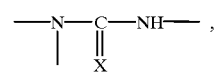

where X represents O or S, which enters into the monomer composition A; and (b) at least one free-radically polymerizable ethylenically unsaturated monomer comprising an N-alkylol or masked N-alkylol functional group which enters into the monomer composition B, wherein the size of the particles of each of the dispersions (A) and (B) is between 50 and 500 nm.

24. A one-component system based on coreactive latexes capable of providing coatings which are crosslinkable at room temperature and post-crosslinkable by heat treatment, the said system consisting essentially of the mixture of two particle dispersions (A) and (B), each derived from aqueous emulsion polymerization of a monomer composition A and B, respectively,
(a) at least one free-radically polymerizable ethylenically unsaturated monomer comprising a functional group

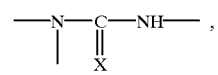

where X represents O or S, which enters into the monomer composition A; and (b) at least one free-radically polymerizable ethylenically unsaturated monomer comprising an N-alkylol or masked N-alkylol functional group which enters into the monomer composition B, wherein monomers other than the monomers (a) and (b) of the two particle dispersions (A) and (B) are chosen so that the glass transition temperatures (Tg) of the resulting copolymers are adapted to the intended field of application, by the combination of monomers capable of leading to homopolymers having a relatively high Tg with monomers capable of leading to homopolymers having a relatively low Tg.

* * * * *